(12) United States Patent
Michalak et al.

(10) Patent No.: US 10,144,315 B2
(45) Date of Patent: Dec. 4, 2018

(54) REAR VEHICLE SEAT WITH STORAGE HOOP AND STRAP ATTACHMENT

(71) Applicant: Johnson Controls Technology Company, Plymouth, MI (US)

(72) Inventors: Eric Michalak, Northville, MI (US); Brent Burton, Windsor (CA); Mason Pike, Howell, MI (US); Nathan Caruss, Ann Arbor, MI (US)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 230 days.

(21) Appl. No.: 15/067,352

(22) Filed: Mar. 11, 2016

(65) Prior Publication Data

US 2016/0264026 A1 Sep. 15, 2016

Related U.S. Application Data

(60) Provisional application No. 62/132,030, filed on Mar. 12, 2015.

(51) Int. Cl.
| | |
|---|---|
| *B60N 2/36* | (2006.01) |
| *B60N 2/01* | (2006.01) |
| *B60N 2/02* | (2006.01) |
| *B60N 2/30* | (2006.01) |
| *B60N 2/90* | (2018.01) |

(52) U.S. Cl.
CPC ............... *B60N 2/366* (2013.01); *B60N 2/01* (2013.01); *B60N 2/02* (2013.01); *B60N 2/305* (2013.01); *B60N 2002/905* (2018.02)

(58) Field of Classification Search
CPC .......... B60N 2/366; B60N 2/305; B60N 2/01; B60N 2/02; B60N 2002/4405; B60N 2/3045; B60N 2/10; B60N 2002/905; B60R 7/043
USPC ................ 297/188.1, 335, 92, 110, 105, 129
See application file for complete search history.

(56) References Cited

U.S. PATENT DOCUMENTS

| 1,643,715 A | * | 9/1927 | Kleinsmith | .......... | B60N 2/0284 |
| | | | | | 296/65.07 |
| 6,203,104 B1 | * | 3/2001 | Matsuo | ................ | B60N 2/3013 |
| | | | | | 297/188.1 |
| 7,537,260 B2 | * | 5/2009 | Epaud | ...................... | B60N 2/06 |
| | | | | | 296/65.09 |
| 2008/0150312 A1 | * | 6/2008 | Lehr | .................... | B60N 2/0232 |
| | | | | | 296/65.08 |

(Continued)

*Primary Examiner* — Milton Nelson, Jr.
(74) *Attorney, Agent, or Firm* — McGlew and Tuttle, P.C.

(57) ABSTRACT

A vehicle seat includes a backrest and a seat base with a fitting with pivot connections for pivoting relative to the backrest. The seat base pivots between a seating position and a stadium flipped up position. A storage hoop has ends pivotably connected to an underside of the seat base at hoop pivot connections. The storage hoop pivots between a stowed position—with the hoop extending along a seat underside—and a hoop deployed position—with the hoop extending outwardly from the seat underside. The fitting with pivot connection has an inertial load lock to maintain the seat base in the stadium flipped up position upon exposure to inertial loads above a crash threshold. A cable is moved upon moving the hoop to the deployed position to move a latching cam, associated with the fitting, to prevent the seat base from pivoting.

16 Claims, 14 Drawing Sheets

(56) References Cited

U.S. PATENT DOCUMENTS

2009/0115229 A1* 5/2009 Messner ................. A47C 7/62
                                                                                  297/188.1

* cited by examiner

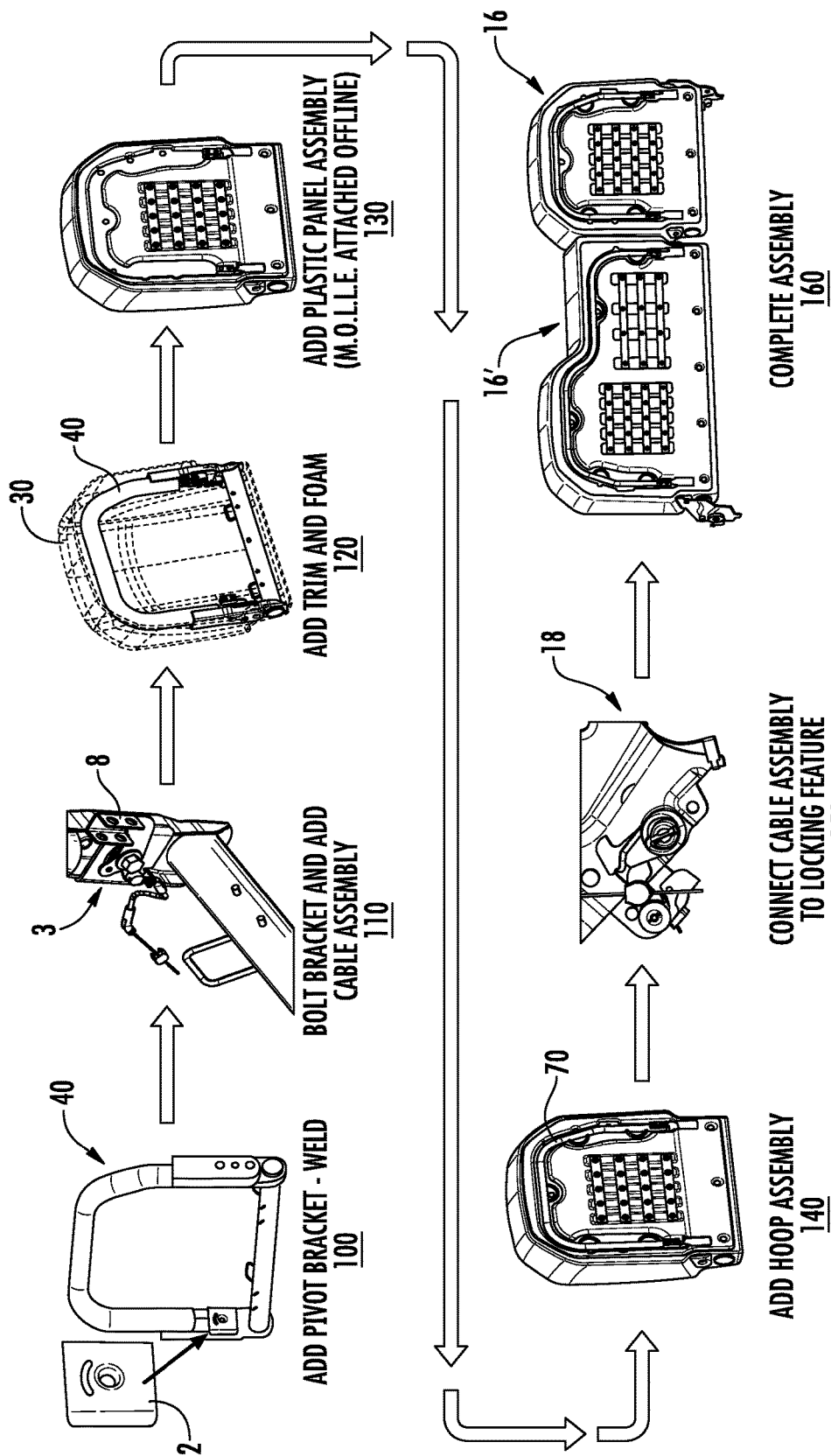

REAR VEHICLE SEAT WITH STORAGE HOOP AND STRAP ATTACHMENT

CROSS REFERENCE TO RELATED APPLICATIONS

This application claims the benefit of priority under 35 U.S.C. § 119 of U.S. Provisional Application 62/132,030 filed Mar. 12, 2015, the entire contents of which are incorporated herein by reference.

FIELD OF THE INVENTION

The present invention relates to a vehicle seat and more particularly to a rear vehicle seat or middle vehicle seat and a vehicle seat arrangement, particularly for a pickup truck.

BACKGROUND OF THE INVENTION

Pickup trucks and vehicles with a cab having a rear wall may have a rear seat behind the row with the driver seat. The rear seat is close to or at the rear cab wall. This presents a trade-off with regard to storage space behind the front row of seats and the provision of seats for rear seat passengers. Although pickup trucks with additional seating in the cab, behind the front row of seats, may have an extended cab, the rear most seats occupy space that could otherwise be used for storing items.

Some pickup trucks have rear seat arrangements with a rear seat row having only limited room and storage space. To allow for a changeover between a seating arrangement and an arrangement which provides more stowage space, the rear seats may be so-called stadium seats that allow the seat base to be folded up and or other positions/configurations.

SUMMARY OF THE INVENTION

It is an object of the invention to provide a vehicle rear seating configuration which provides support for stored items with the vehicle seat bottom in a stadium flipped up position and also for items hung under the seat in a seated position.

According to the invention, a vehicle rear seat is provided with a backrest and with a seat base (also known as a cushion). The seat base is connected to the backrest such that the seat base can pivot up to a stadium flipped up position. At an underside of the seat base a storage hoop is pivotably connected to the seat base at hoop pivot connections. The hoop pivot connections have pivot locations that are toward or near to the seat base pivot of the seat base. With the seat base in a stadium flipped up position and with the hoop in a pivoted out state, the hoop extends outwardly and substantially horizontally from the seat base.

The hoop is pivotably connected to the seat base, at the hoop pivot connections, so as to enable a locking cam feature of the seat base when the seat is in the stadium flipped up position and the hoop is in a pivoted out state (hoop deployed position). The locking feature prevents the seat base (seat cushion) from pivoting down when the load is applied to the pivot through the hoop pivot. Advantageously the hoop pivot pulls a cable that rotates a cam to a position to lock with (engage) a detented region on the seat base pivot (cushion pivot).

The hoop may include features such that when the hoop is pivoted down, it may extend outwardly or forward. This may be provided based on telescopic arms of the storage hoop.

The hoop can also act as support for a shelf surface for an extra level of storage. This may be a ridged covering which is directly supported by the hoop or supported by a frame on the b-side of the seat base (underside of the cushion). Such a support frame allows movement of the rigid covering to change the position of the surface of the rigid covering. The covering may also be flexible and may be, for example, supported by the hoop and extend between edges of the hoop.

The hoop may have attachment features for adhering straps, bungees, ropes and other items, inside and outside of the hoop. The hoop may have additional hoop loops or hooks.

The b-surface of the seat base (underside of the cushion) advantageously may have straps acting as or forming modular lightweight load-carrying equipment (M.O.L.L.E). This may advantageously cooperate with a hard panel surface or other surface of the seat base under side. For example, the seat base underside may have grooves and ridges or recesses cooperating with the straps for further storage possibilities.

Any seat that has a configurable cushion (seat base) or backrest can utilize the features according to the invention. Additionally, a seat that fully pivots backwards can also utilize such a pivoting storage hoop. In the embodiments, the hoop acts as a structural support, can extend out, and has attachment points for straps, nets, bags, pockets etc. The lock mechanism allows the hoop to be used without the seat base (cushion) being closed and to prevent the seat base (cushion) from moving. The hoop provides a storage shelf or storage wall at the b-surface, particularly with the M.O.L.L.E attachment.

The seatback may also have similar features and be folded rearwardly, in the case of a rear seat row with cargo space behind the rear seat. The hoop and other features noted above may be provided based on a rearward pivoting.

The invention provides a seating system and a vehicle seating arrangement and vehicle seats that maximize the utilization of storage space. The invention provides a storage system that secures and protects items, including potentially both short and long term storage items. The invention provides good accessibility to stored items as well as ease of reconfiguring, intuitive use and user mode adaptability.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 6 is a view showing steps in a process for manufacturing a seat assembly with seat bases according to the invention;

DESCRIPTION OF THE PREFERRED EMBODIMENTS

Figure 1A:
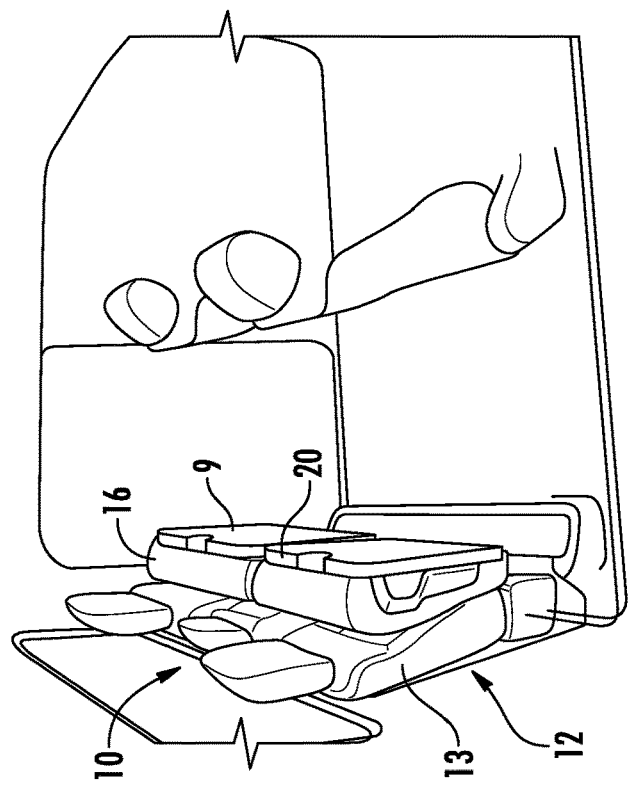
FIG. 1A is a perspective schematic view showing a vehicle seat configuration with rear stadium flip up seats flipped up and with storage hoops in a stowed position.
Figure 1B:
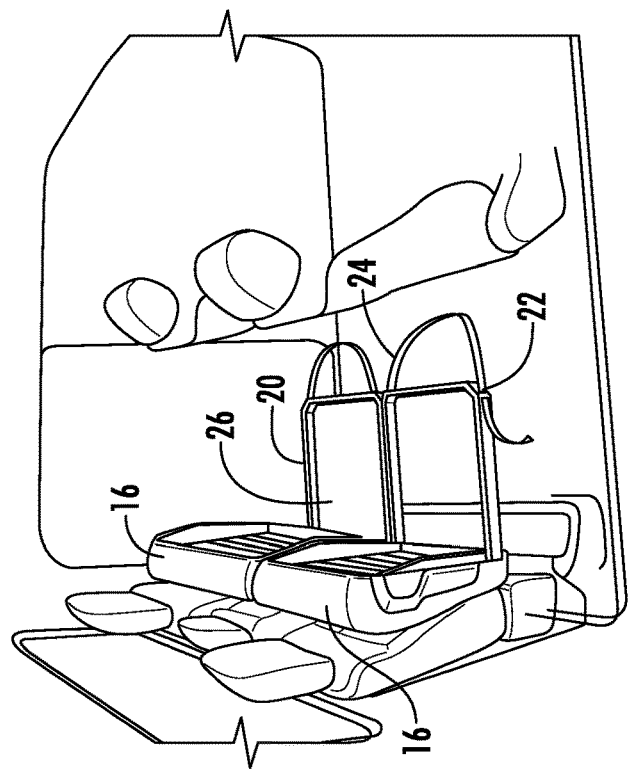
FIG. 1B is a perspective schematic view showing the vehicle seat configuration of FIG. 1A with storage hoops in a deployed position.

Referring to the drawings, FIGS. 1A and 1B show several features of rear vehicle seats (rearward seats) according to the invention. A seat arrangement generally designated 10 includes two seats generally designated 12. The arrangement could have a single bench seat and advantageously includes two seats such as a 50/50 seat arrangement or a 40/60 arrangement of two seats 12. Each seat 12 includes a backrest 13 and a seat base (cushion) 16. Each seat base 16 has an underside (b-side) 9 with a storage hoop 20.

FIG. 1A shows the two seat bases 16 in a stadium flipped up position and with the storage hoops 20 in a stowed position. FIG. 1B shows the storage hoops 20 in a hoop deployed position, pivoted relative to the underside 9. The storage hoop 20 has attachment features such as additional loops or pass-through slots 22 that can receive one or more straps 24. In addition, a shelf surface 26, for an extra level of storage, is supported by the storage hoop 20. The shelf surface 26 may be flexible and attached to the storage hoop 20 at various points. The shelf surface 26 may be retractable and stored in a role. The shelf surface or tray 26 may also be rigid and be connected and disconnected as necessary.

Figure 2:
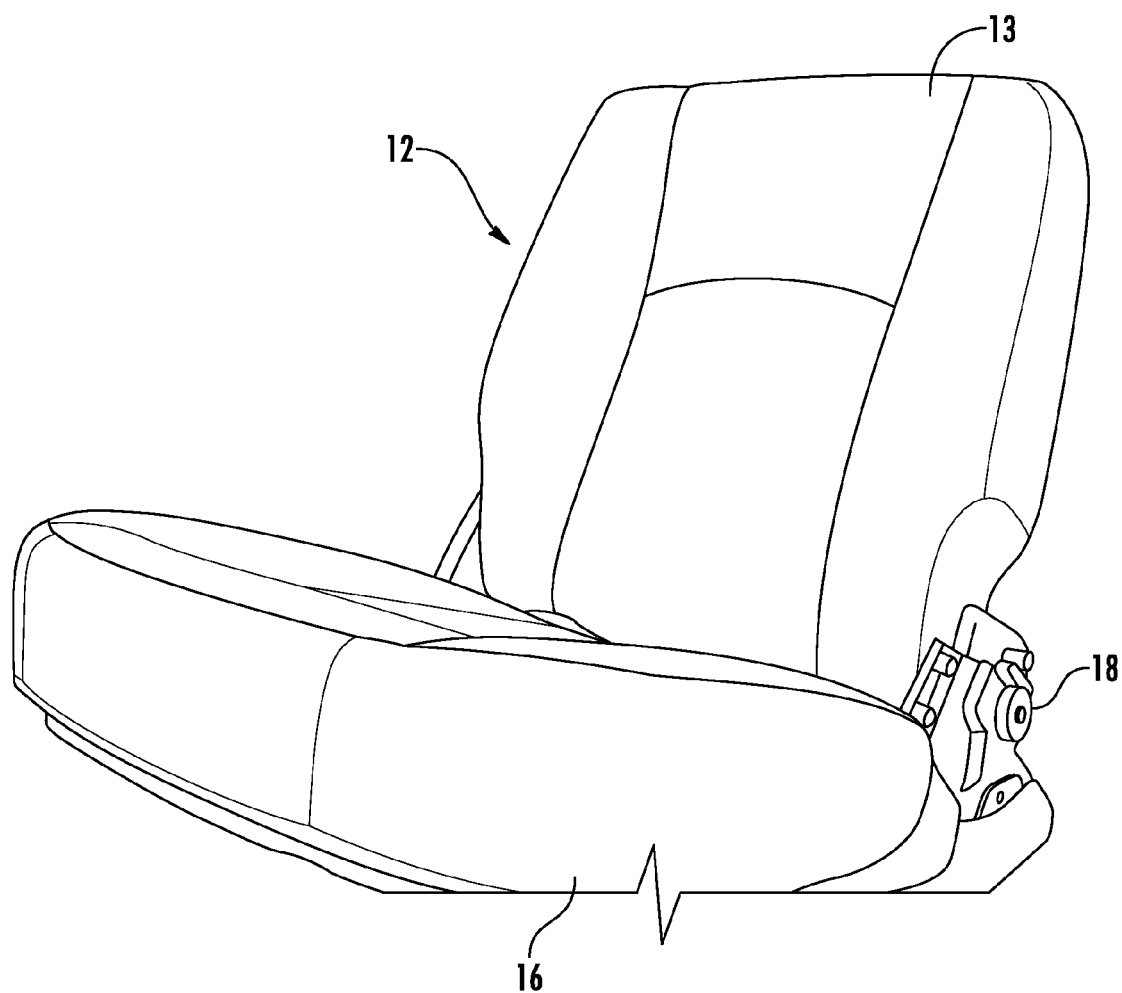
FIG. 2 is a perspective view showing a vehicle seat according to the invention with stadium seating feature and with a storage hoop.

FIG. 2 shows one of the seats 12 with stadium seating feature and with storage hoop 20. The seat base 16 is shown in a seated position. The seat base 16 is connected to supporting structure 200 and to the backrest 13 by a pivot structure (fitting part) generally designated 18, with an inertial latch. The adjacent seat 12, whether it is a 50%, 40% or 60% sized seat, will have similar features. The features of the two seats are essentially mirrored with the pivot structures (fitting) 18, 18' on opposite sides. The seat base 16 is biased into a flipped position by a spring associated with the pivot structure 18. The seats can normally be pivoted down (against the spring bias). The inertial latch associated with the pivot structure 18 holds the position of the seat base 16 in the case of an inertial load (a crash situation).

Figure 3:
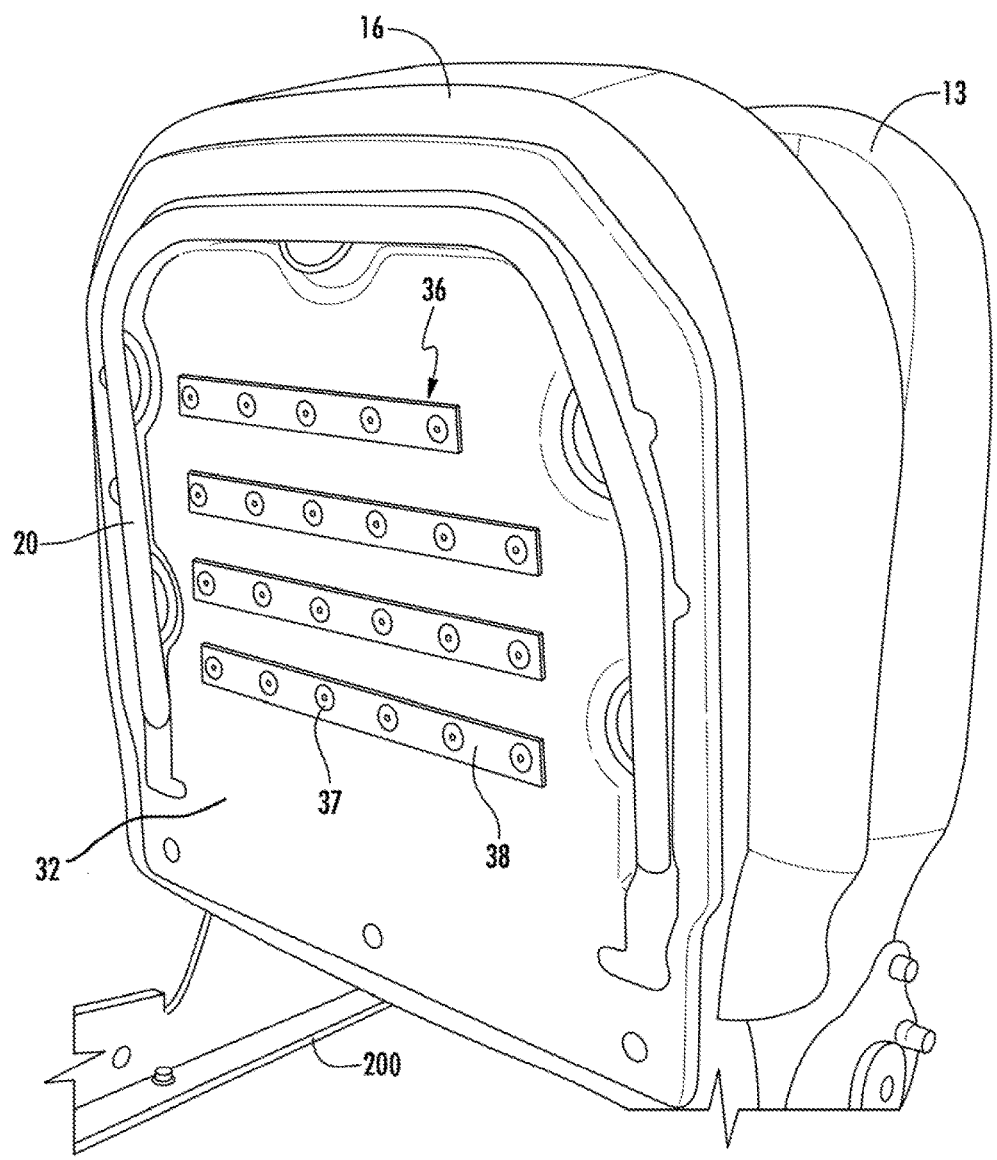
FIG. 3 is a perspective view showing the vehicle seat of FIG. 2 with the bottom seat flipped up and with the storage hoop in a stowed position.
Figure 4:
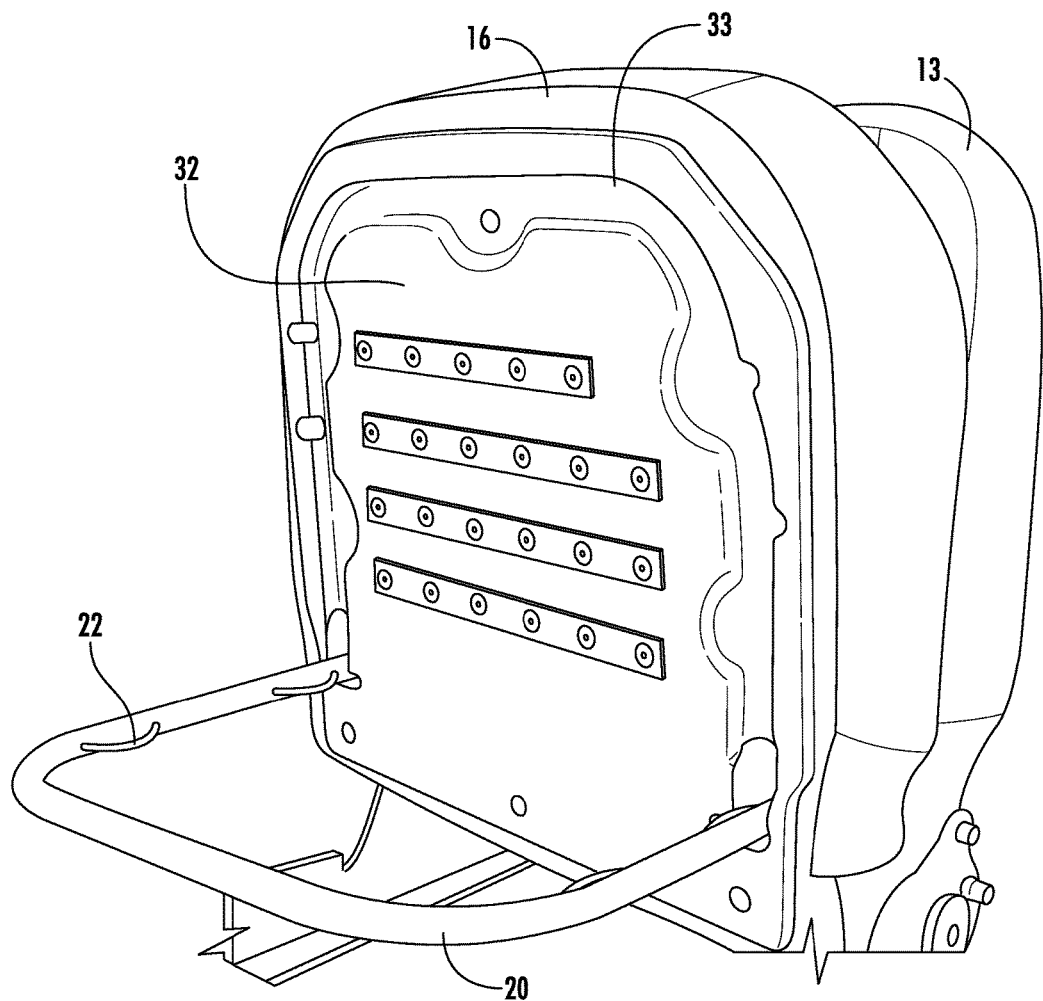
FIG. 4 is a perspective view showing the vehicle seat of FIG. 2 with the seat base flipped up and with the storage hoop in a hoop deployed position.

FIGS. 3 and 4 show the seat 12 in a flipped up position. At the underside 9, a hardshell (plastic, metal, textile) 32 is provided. The seat with the connected hardshell 32 supports the storage hoop 20. The hardshell 32 supports storage features, particularly in the form of a plurality of support points 37 with nylon bands 38 for supporting various items. This may be in the form of a modular lightweight load-carrying equipment (M.O.L.L.E) and is referenced hereinafter as M.O.L.L.E 36. Other pockets and support structures may also be provided attached to the hardshell 32. In FIG. 4 the storage hoop 20 is in a hoop deployed position. From this view it can also be seen that the hardshell 32 includes a receiving groove 33 to accommodate the storage hoop 20. In FIG. 4 it can also be seen that the storage hoop 20 includes loop structures 22 for attaching items or attaching items via bungee cords or straps or the like.

Figure 5A:
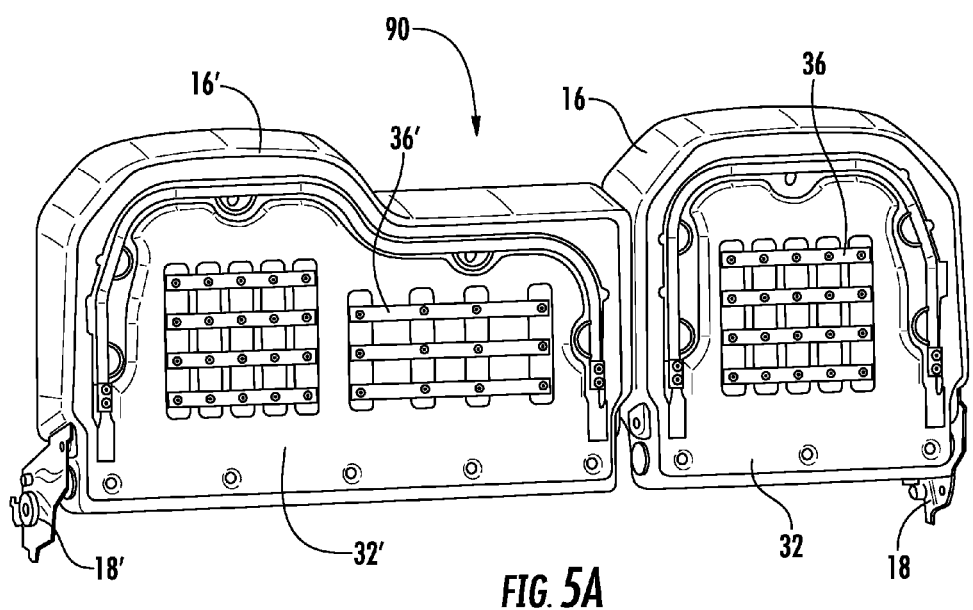
FIG. 5A is a front perspective view of a 60/40 rearward vehicle seat arrangement of seat bases of vehicle seats with the stadium seating feature showing the seat base flipped up and with storage hoops in a stowed position.
Figure 5B:
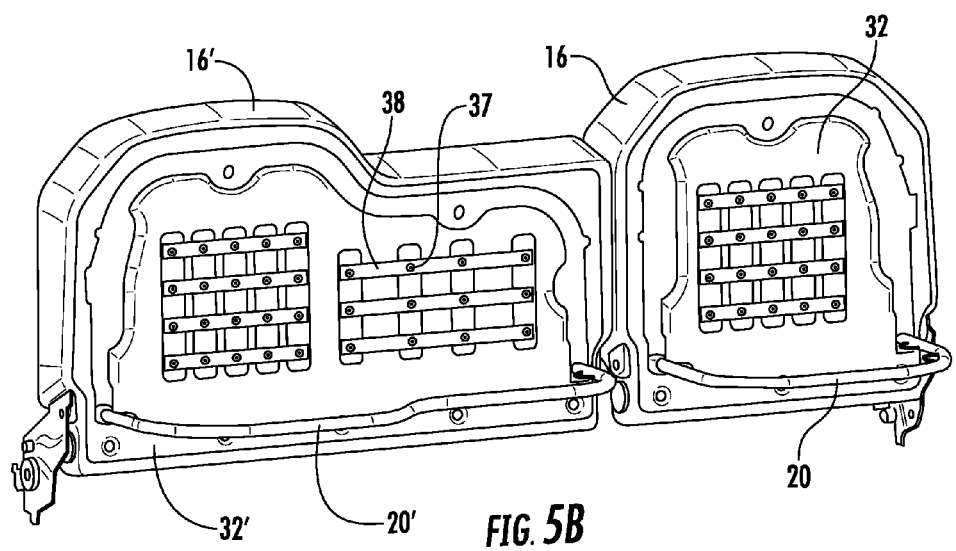
FIG. 5B is a front perspective view of the seat bases of the vehicle seat arrangement of FIG. 5A with storage hoops in a deployed position.

FIG. 5A shows a seat arrangement 90 with a seat base 16' and an adjacent seat base 16, providing a 60/40 arrangement. FIG. 5A shows the opposite pivot structures (fitting part) 18 and 18' as well as the hardshell 32 and 32' and M.O.L.L.E 36 and 36'. In FIG. 5B the two storage hoops 20 and 20' are shown in the hoop deployed position. Although the dimensions and shapes of the two seat bases 16 and 16' are different, the construction is essentially the same. Accordingly in the following the construction of one of the seats is described with it being appreciated that other seats of other relative dimensions can be provided in a similar manner.

Particular steps for manufacturing a seat according to the invention are shown in FIG. 6. The process starts at 100 with a base (frame) structure 40. Hoop pivot brackets 2 are added, such as by welding. As shown at step 110 a cable assembly 3 and bolt bracket 8 are attached. Trim and foam 30 are added to the base structure 40 as shown at step 120. The hardshell (plastic panel assembly) 32 is added, including M.O.L.L.E 36. The hoop tube assembly 70 is connected as shown at step 140. The cable 56 of the cable assembly 3 is connected to the latch cam locking feature at the pivot arrangement 18 as shown in step 150. The full assembly with seat base 16' and seat base 16 is provided as shown at step 160.

Figure 7:
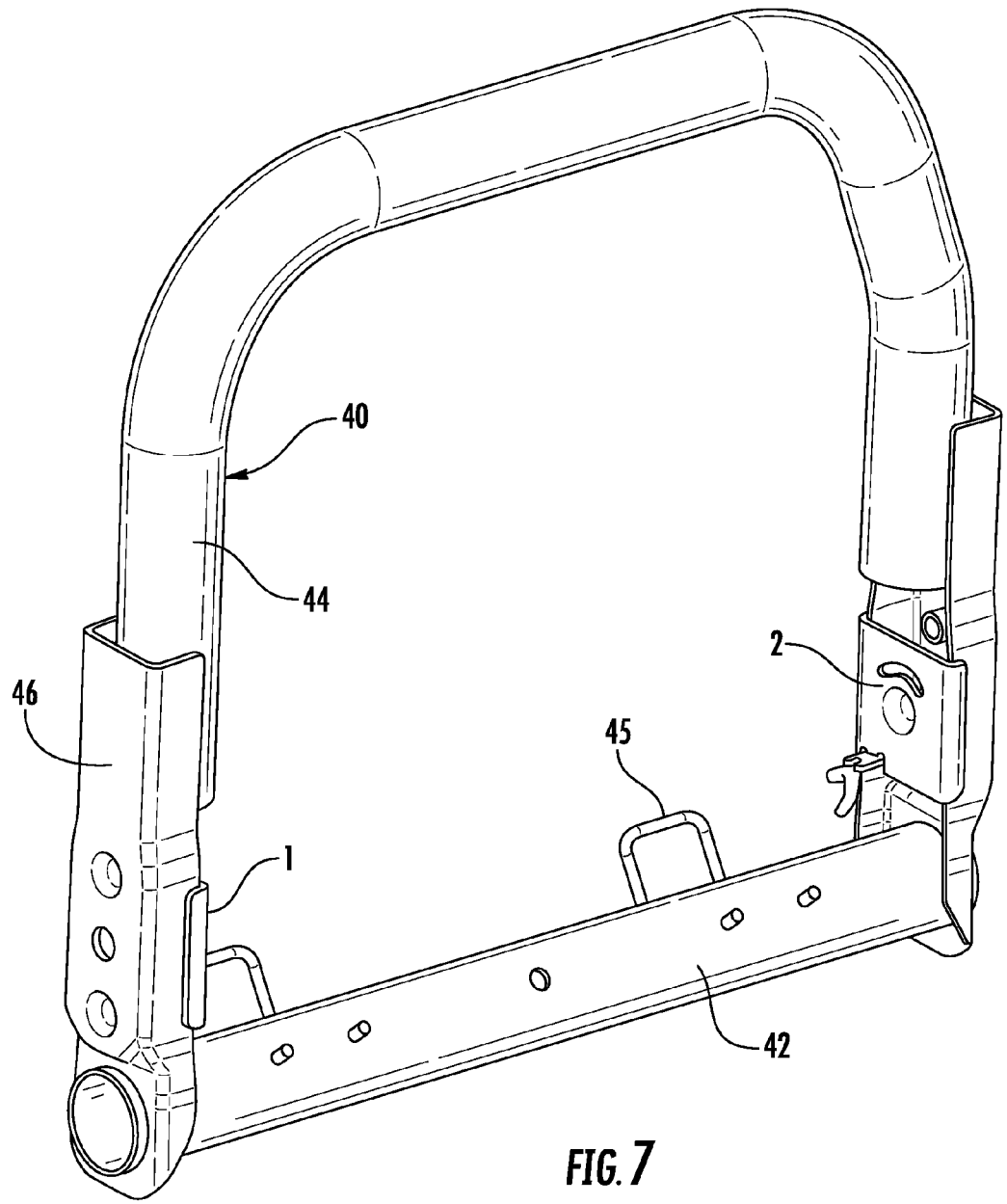
FIG. 7 is a perspective view showing a base structure with added pivot brackets.
Figure 8:
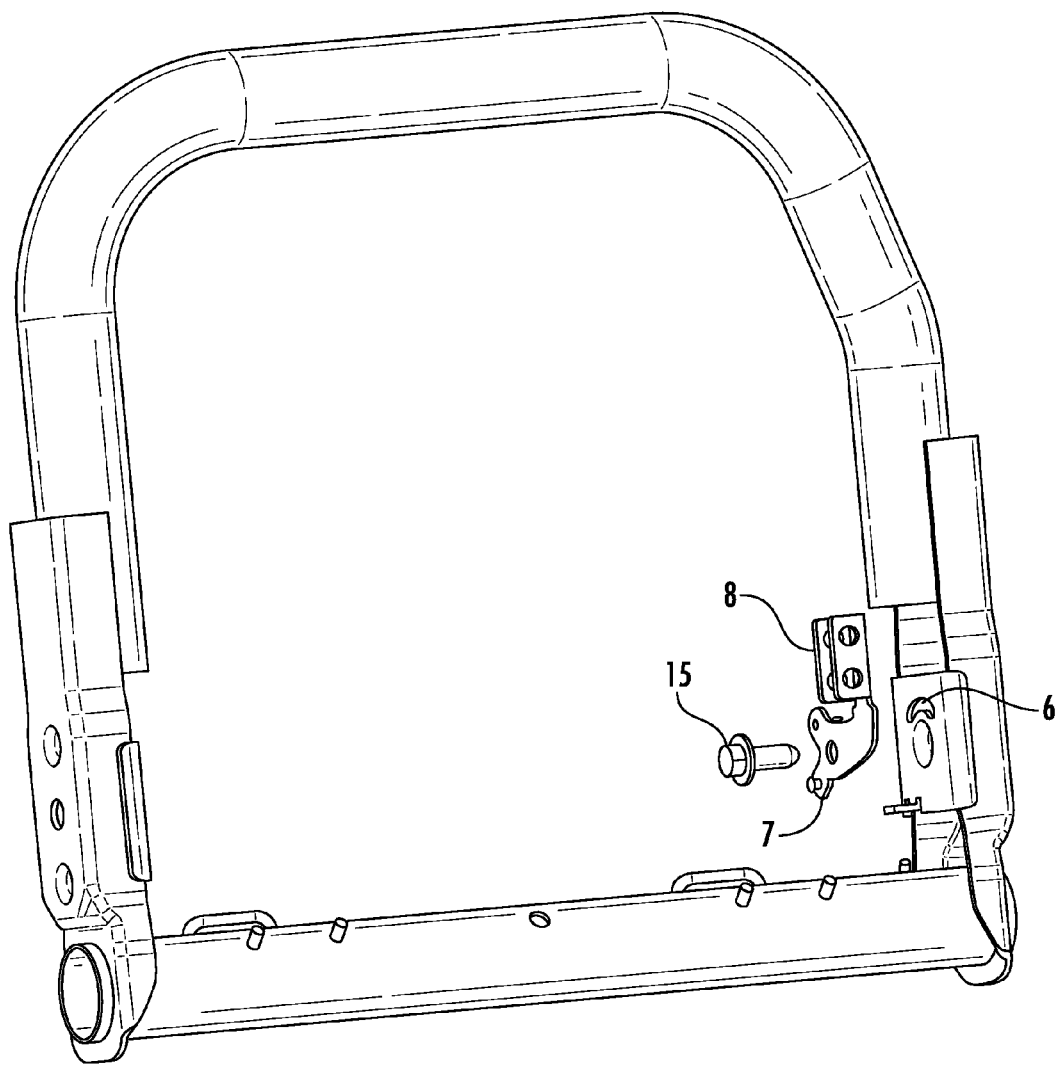
FIG. 8 is a perspective view showing the base structure with hoop pivot structure.
Figure 9:
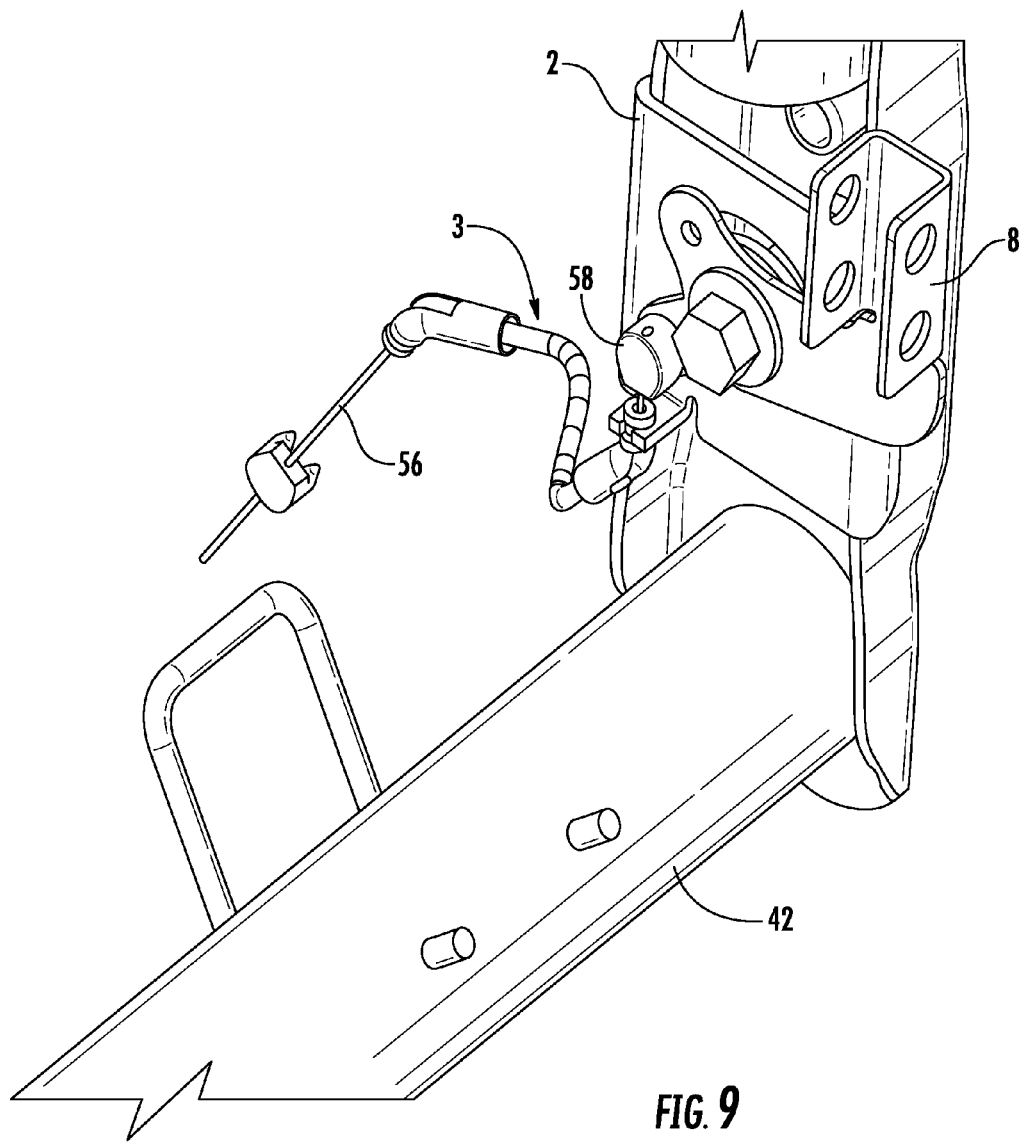
FIG. 9 is a cutaway perspective view showing a cable assembly connected to the hoop pivot structure.
Figure 10:
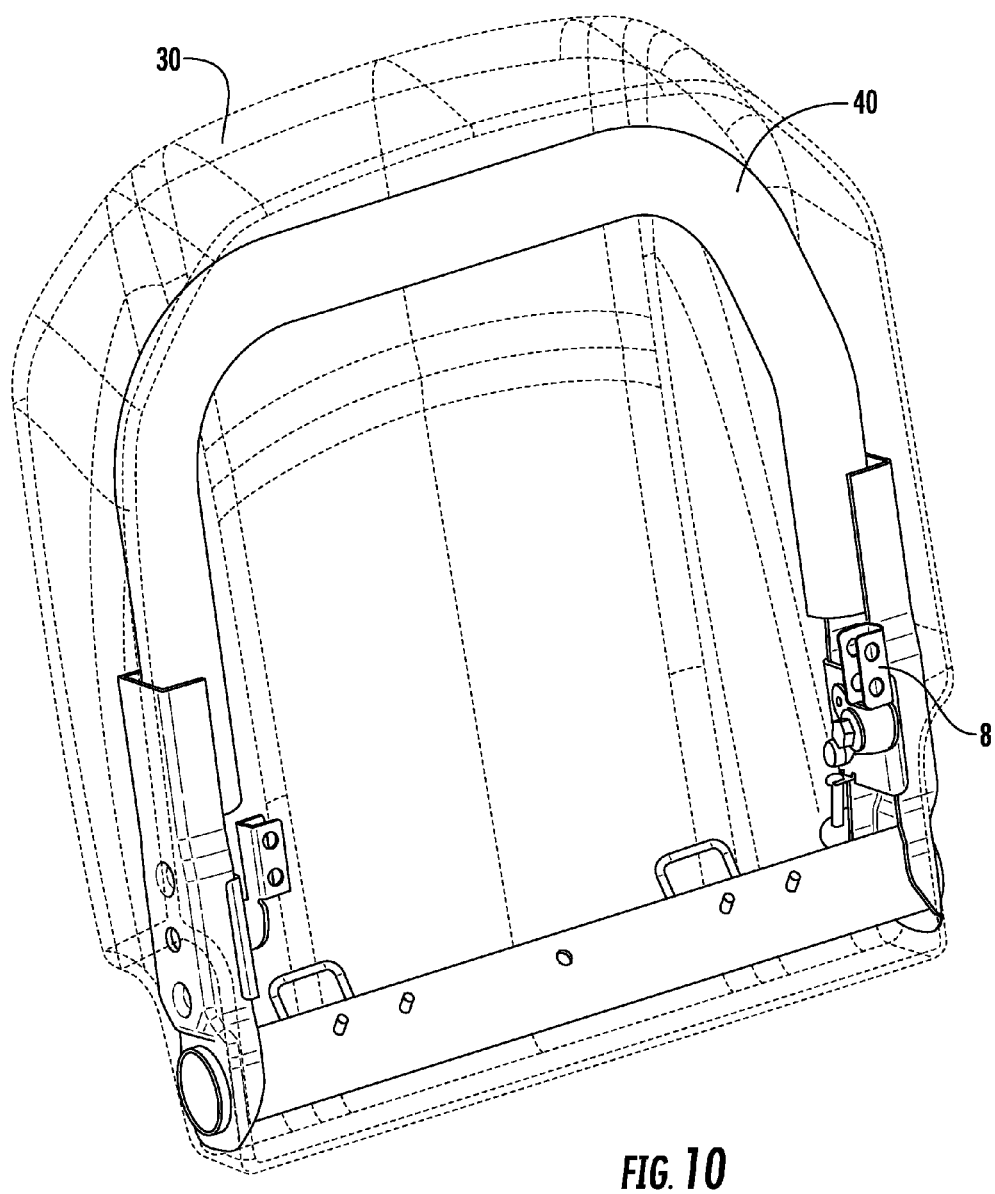
FIG. 10 is a perspective view showing the base structure with hoop pivot structure and cable assembly and with trim and foam shown in a partially transparent manner.
Figure 11:
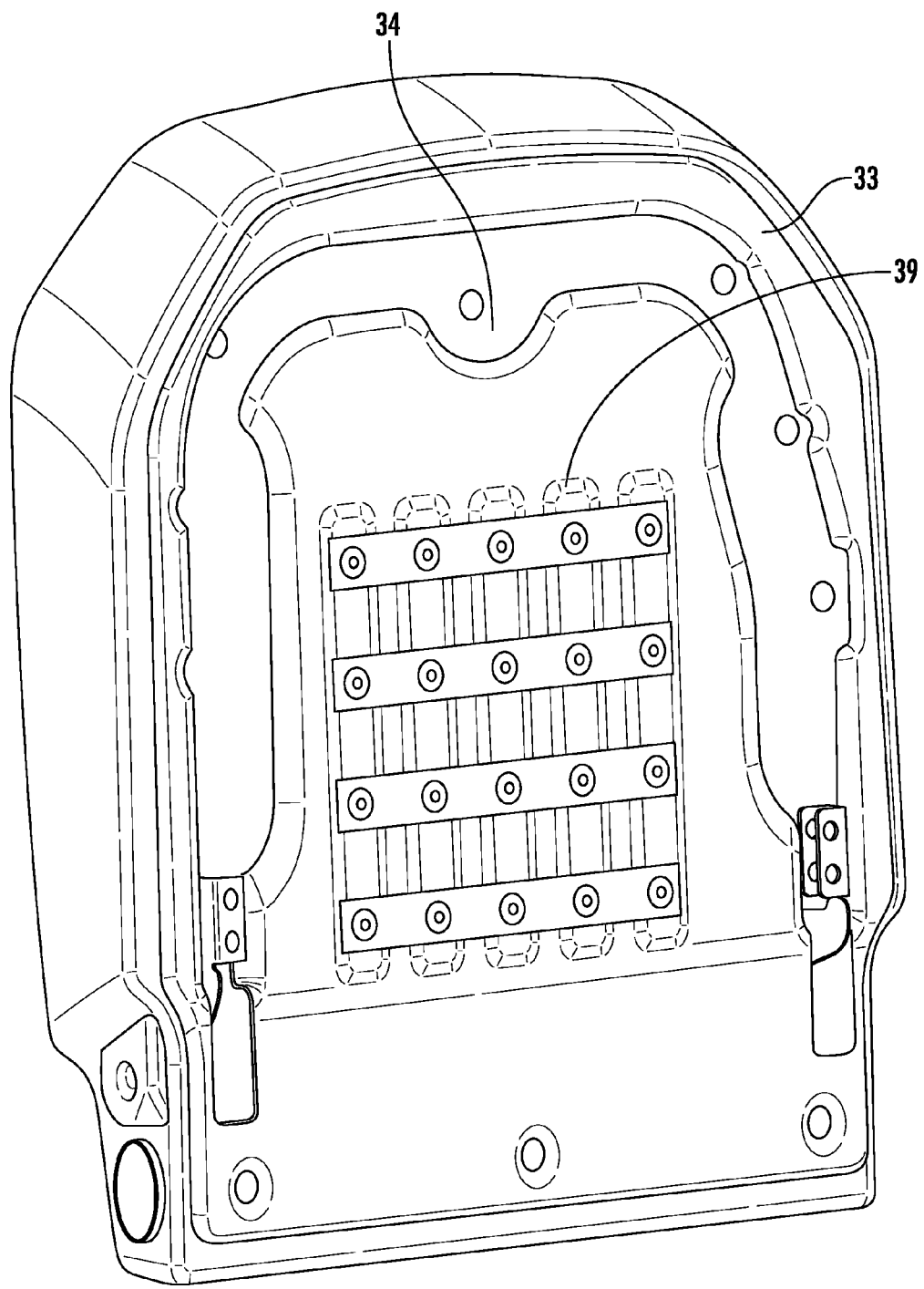
FIG. 11 is a perspective view showing the hard panel assembly with M.O.L.L.E. attachments connected with bottom seat base structure of FIG. 10.

As shown in FIG. 7, the base structure 40 includes two hoop pivot plates 1 and 2 as well as the cross tube 42 with feature 45. The cross tube 42 is connected by brackets 46 to the base support tube 44. As shown in FIG. 8, the hoop bracket 8 is connected by a bolt 15 to the pivot plate 1, 2 to allow the hoop bracket 8 to pivot along guide 6. The hoop bracket 8 has an end 7 for connection to the cable assembly 3. The cable assembly 3 is shown in FIG. 9 with a connection end 58 of the cable 56 connected to the end 7 of the hoop bracket 8. After these features are connected, the foam and trim 30 is connected to the base structure 40 as shown in FIG. 10.

After the foam and trim 30 have been connected, the hard panel 32 is fixed to the foam 30 and the base structure 40. The bracket 8 passes through the hard panel assembly 32. The hard panel assembly 32 includes recessed portions 33 and 34 that accommodate features of the storage hoop 20. The hard panel assembly 32 may also include grooves or channels or are protruding parts 39 that cooperate with the features of the M.O.L.L.E 36.

Figure 12:
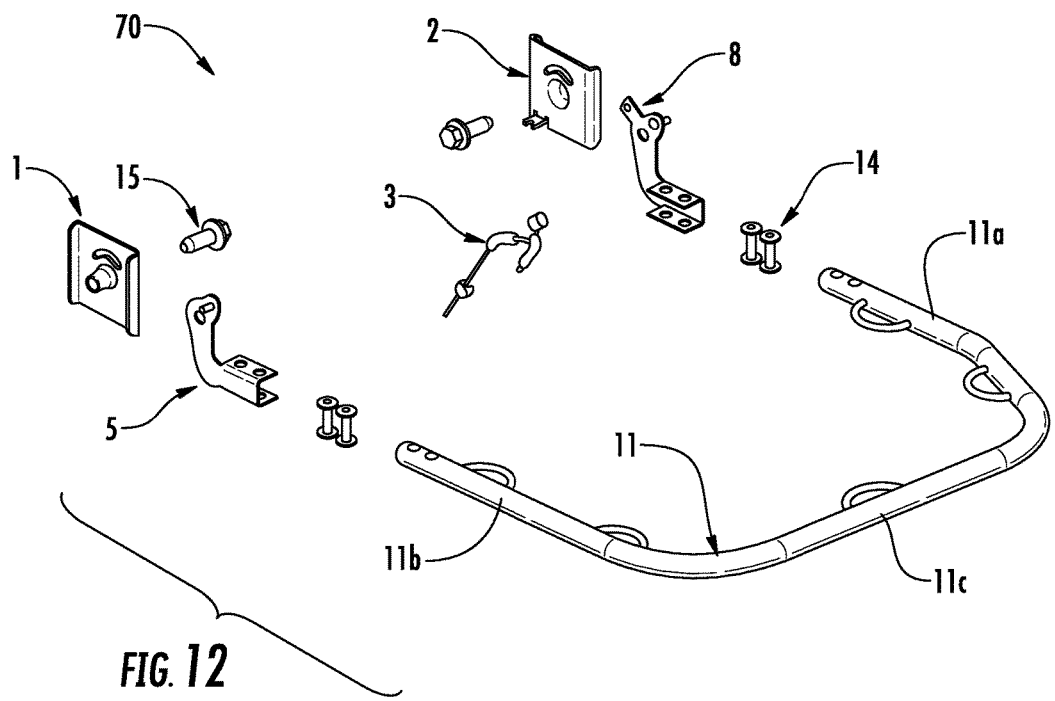
FIG. 12 is an exploded view of a hoop assembly.

FIG. 12 shows the assembly 70 in an exploded form. The hoop tube 11 is connected to brackets 5 and 8 via opening passages in the tube 11 and nut and bolts sets 14. Bolt sets 14 pass through respective opening passages in the tube 11 to fix the tube 11 to the respective brackets 5 and 8. The hoop tube 11 may be a multi part construction with two side arms 11a and 11b respectively extending from brackets 5 and 8 to connection ends connecting with an outer U-shaped hoop part 11c. The outer U-shaped hoop part 11c is mounted in the respective connection ends of side arms 11a and 11b to slide outwardly relative to the two side arms 11a and 11b in a telescoping manner. The telescoping U-shaped hoop part 11c and side arms 11a and 11b allow the hoop 11 to extend further outwardly. FIG. 12 also shows the brackets 1 and 2 as well as the cable assembly 3.

Figure 13:
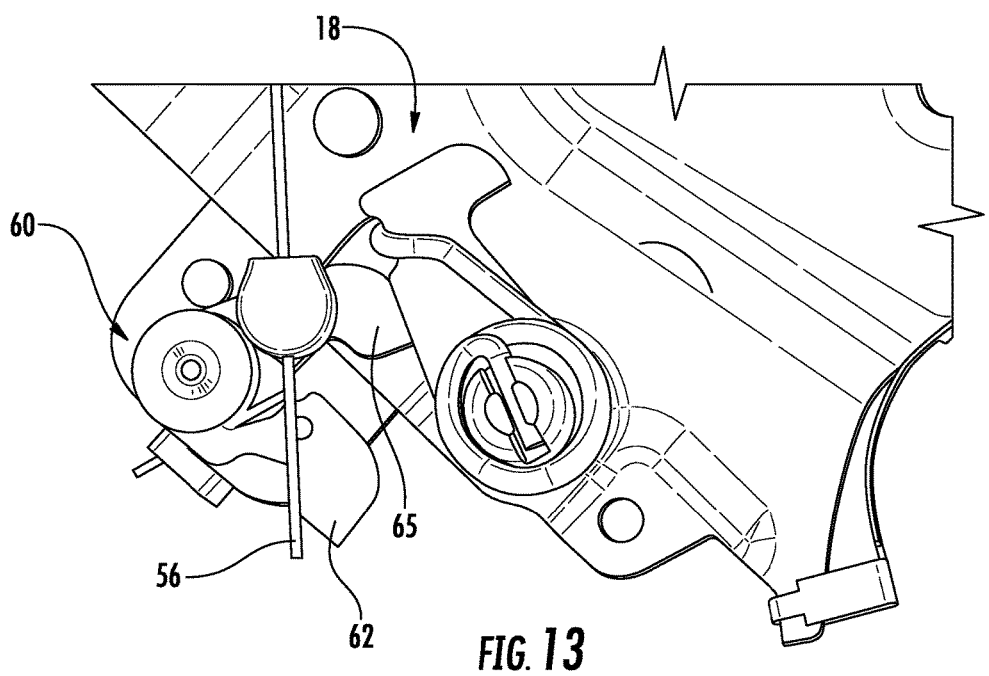
FIG. 13 is a perspective view of an inertial lock of the seat base fitting (pivot structure) with added cable actuated latch.

After the tube 11 is connected to the base structure 40 and hence to the remainder of the seat base 16, the cable 56 can be connected to a latch cam (cable actuated latch) 65 of the inertial lock 60 associated with the pivot arrangement 18. As is generally known, a latch lock such as latch lock 60 of the seat fitting 18 may include a locking cam 62 that moves into a locked state when the seat base is subjected to an inertial load that exceeds a crash threshold. The invention provides a latch cam 65 that is moved into a locked state, as shown in FIG. 13, when the storage hoop 20 is moved from the stowed position to the deployed position. This occurs as the hoop bracket 8 pivots with the tube 11 and pulls cable 56. As shown in FIG. 13, cable 56 is connected to the latch cam 65, which then rotates into the locked position. With the latch cam 65 in a locked position the seat base 16 is prevented from pivoting down when a load is applied to the pivot bracket 8 via the storage hoop 20.

Figure 14:
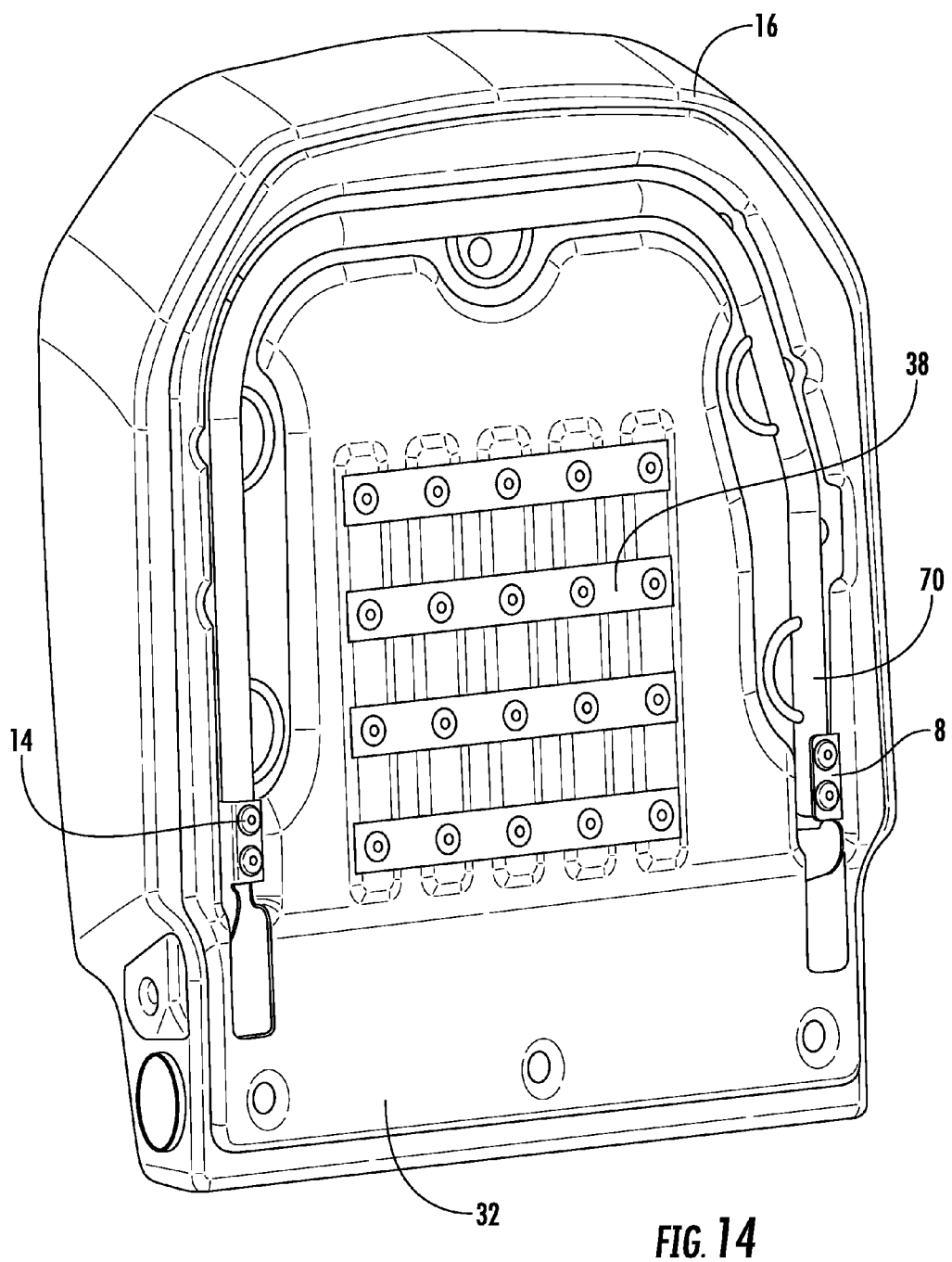
FIG. 14 is a perspective view of the seat base structure of FIG. 11 with connected hoop assembly.

FIG. 14 shows the seat base structure connected with the hoop tube assembly 70. The hoop tube assembly 70 is connected via cap nuts 14 to the bracket 8. The pivoting motion of the storage hoop 20 brings about the locking of the seat base 16, as noted above. During the pivoting motion, features stored with the M.O.L.L.E 36 are not interfered with.

Figure 15:
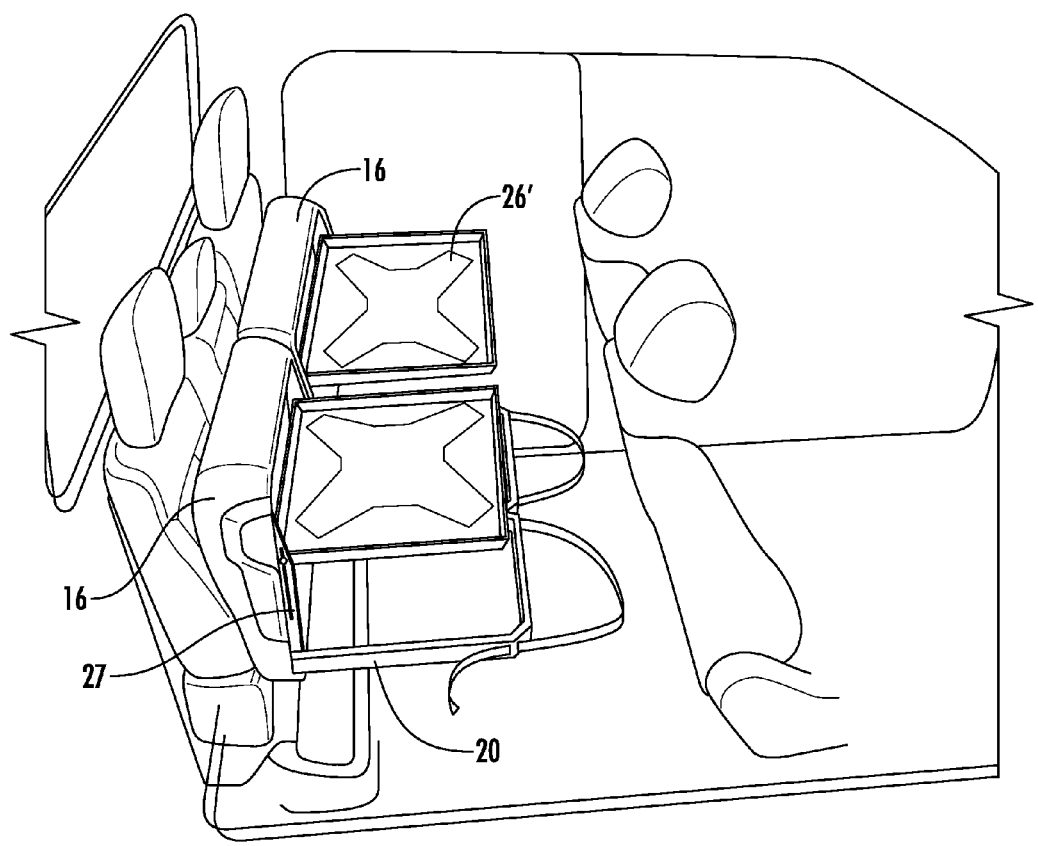
FIG. 15 is a perspective schematic view showing an alternative embodiment.

FIG. 15 schematically shows an alternative seat arrangement and seat embodiment in which the seat base 16 is constructed essentially in the same way as discussed above. However, the hard panel assembly 32 includes a guide frame structure 27 defining a support guideway for holding a tray or shelf surface 26'. In this embodiment, the shelf surface 26' is rigid or is fabric or a net and which may be supported in a stretched taught state. Preferably, the attachment to the guide frame 27 allows the tray to be raised and lowered and set, such as by pins or posts cooperating with a set of setting detents, in position in any location along the guide frame 27. The attachment to the guide frame 27 may be a detachable connection. The tray/shelf surface 26' may also be fixed to move along the guide frame 27 and to be positionable flush with the storage hoop 20 for pivoting up with the storage hoop 20, from a deployed position to a stowed position.

Although the examples shown in FIGS. 1A, 1B and 15 relate to a pickup truck type cab, particularly with a rear seat that is adjacent to a rear wall of the pickup truck cab, the invention may be used for other arrangements, including middle seats and rear most seats which are not at a cab rear wall. Further, where there is space behind the seat, the backrest and the seat base may be rotated over backwards, such that the hoop attached to the seat base extends rearwards instead of forwards.

While specific embodiments of the invention have been shown and described in detail to illustrate the application of the principles of the invention, it will be understood that the invention may be embodied otherwise without departing from such principles.

What is claimed is:

1. A vehicle seat comprising:
   a backrest;
   a seat base connected to the backrest;
   pivotable hoop connections connected to an underside of the seat base; and
   a storage hoop with hoop ends respectively connected to the respective pivotable hoop connections, whereby the storage hoop pivots between a stowage position with the storage hoop extending along a seat underside to a hoop deployed position with the hoop extending outwardly from the seat underside, wherein the seat base has seat base fittings forming a part of pivot connections between the backrest and the seat base for pivoting the seat base relative to the backrest between a seating position and a stadium flipped up position.

2. A vehicle seat according to claim 1, wherein the seat base underside has a hard panel surface with one of grooves, ridges, recesses and protuberances.

3. A vehicle seat according to claim 1, wherein the pivotable hoop connections have pivot locations that are respectively adjacent to the seat base pivot connections, such that in a pivoted out state the hoop extends outwardly and substantially horizontally from the seat base.

4. A vehicle seat according to claim 1, further comprising a cable assembly with a cable connected to one of the pivotable hoop connections wherein at least one of the seat base pivot connections has a latching cam connected to the cable of the cable assembly to lock the seat base in a position to prevent the seat base from pivoting relative to the backrest in the hoop deployed position.

5. A vehicle seat according to claim 4, wherein the seat base comprises
   a base frame structure;
   foam and trim connected to the base frame structure, wherein:
   the pivotable hoop connections comprise pivot brackets fixed to the base frame structure and brackets respectively fixed at the hoop ends and pivotably mounted to respective pivot brackets; and
   the cable is connected to the pivotably mounted brackets to extend and retract in response to movement of the hoop between the stowage position and the deployed position.

6. A vehicle seat according to claim 5, wherein the storage hoop comprises a multi part construction comprising:
   two side arms respectively extending from brackets to connection ends; and
   an outer U-shaped hoop part with first and second U-shaped hoop ends respectively connected to the connection ends of the two side arms, wherein the outer U-shaped hoop part is mounted in the respective connection ends of side arms to telescopingly slide outwardly relative to the two side arms.

7. A vehicle seat according to claim 1, further comprising a shelf surface supported by the hoop, the shelf surface being one of rigid and flexible.

8. A vehicle seat according to claim 1, wherein the hoop has attachment features comprising additional hoop loops or hooks for adhering straps, bungees, ropes and other items inside and outside of the hoop.

9. A vehicle seat according to claim 1, wherein the seat underside has straps supported relative to the seat underside to form a modular lightweight load-carrying equipment.

10. A vehicle seat arrangement comprising:
    front seats; and
    at least one rearward seat, disposed rearwardly of the front seats, the rearward seat comprising:
    a backrest;
    a seat base connected to the backrest;

pivotable hoop connections connected to an underside of the seat base; and a storage hoop with hoop ends connected respectively to the respective pivotable hoop connections, whereby the storage hoop pivots between a stowage position with the storage hoop extending along a seat underside to a hoop deployed position with the hoop extending outwardly from the seat underside, wherein the seat base has seat base fittings forming as part of pivot connections between the backrest and the seat base for pivoting the seat base relative to the backrest between a seating position and a stadium flipped up position.

11. A vehicle seat arrangement according to claim 10, further comprising a cable assembly with a cable connected to one of the pivotable hoop connections wherein at least one of the seat base pivot connections has a latching cam connected to the cable of the cable assembly to lock the seat base in a position to prevent the seat base from pivoting relative to the backrest in the hoop deployed position.

12. A vehicle seat arrangement according to claim 11, wherein the seat base comprises:

a base frame structure;

foam and trim connected to the base frame structure, wherein:

the pivotable hoop connections comprise pivot brackets fixed to the base frame structure and brackets respectively fixed at the hoop ends and pivotably mounted to respective pivot brackets; and the cable is connected to at least one of the brackets respectively fixed at the hoop ends, to extend and retract in response to movement of the hoop between the stowage position and the deployed position.

13. A vehicle seat arrangement according to claim 12, wherein the storage hoop comprises a multi part construction comprising:

two side arms respectively extending from brackets to connection ends; and an outer U-shaped hoop part with first and second U-shaped hoop ends respectively connected to the connection ends of the two side arms, wherein the outer U-shaped hoop part is mounted in the respective connection ends of side arms to telescopingly slide outwardly relative to the two side arms.

14. A vehicle seat arrangement according to claim 10, wherein the pivotable hoop connections have pivot locations that are respectively adjacent to the seat base pivot connections, such that in a pivoted out state the hoop extends outwardly and substantially horizontally from the seat base.

15. A vehicle seating and storage method comprising:

providing at least one rearward seat, rearwardly of front seats, the rearward seat comprising a backrest, a seat base connected to the backrest, pivotable hoop connections connected to an underside of the seat base and a storage hoop with hoop ends connected respectively to the respective pivotable hoop connections, whereby the storage hoop pivots between a stowage position with the storage hoop extending along a seat underside to a hoop deployed position with the hoop extending outwardly from the seat underside;

storing one or more items within a perimeter defined by the hoop, with the hoop in the hoop deployed position, wherein the seat base has seat base fittings forming a part of pivot connections between the backrest and the seat base for pivoting the seat base relative to the backrest between a seating position and a stadium flipped up position, wherein the pivotable hoop connections have pivot locations that are respectively adjacent to seat base pivot connections, such that in a pivoted out state the hoop extends outwardly and substantially horizontally from the seat base.

16. A vehicle seating and storage method according to claim 15, wherein:

the at least one rearward seat further comprises a cable assembly with a cable connected to one of the pivotable hoop connections wherein at least one of the seat base pivot connections has a latching cam connected to the cable of the cable assembly to lock the seat base in a position to prevent the seat base from pivoting relative to the backrest in the hoop deployed position; and the seat base comprises a base frame structure, foam and trim connected to the base frame structure, wherein the pivotable hoop connections comprise pivot brackets fixed to the base frame structure and brackets respectively fixed at the hoop ends and pivotably mounted to respective pivot brackets and the cable is connected to the pivotably mounted brackets to extend and retract in response to movement of the hoop between the stowage position and the deployed position.

* * * * *